Feb. 9, 1960 M. A. MOSKOVITZ 2,924,469
BALL JOINT FOR INDEPENDENT STEERABLE WHEEL SUSPENSIONS
Filed Nov. 8, 1954 2 Sheets-Sheet 1
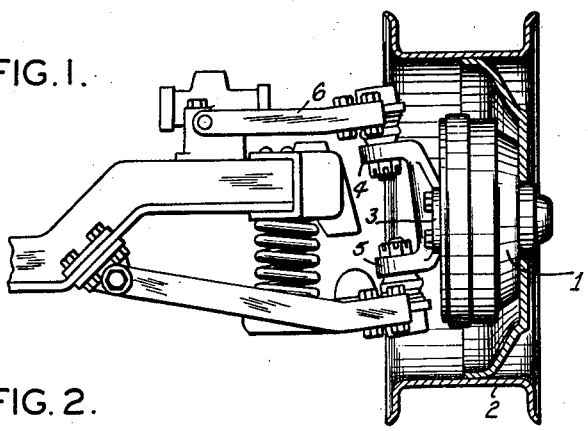
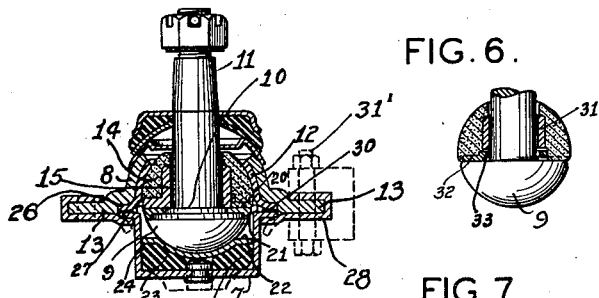
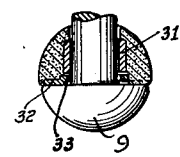
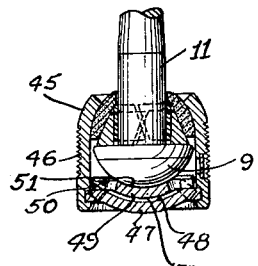
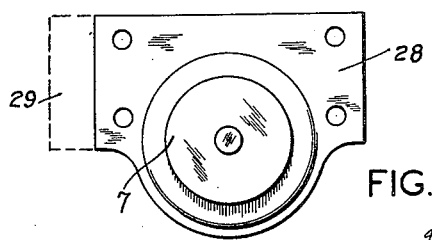
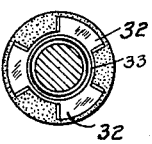
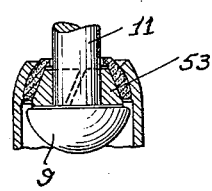
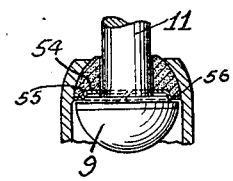
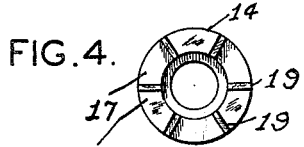
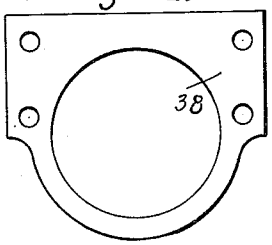
INVENTOR,
MILTON A. MOSKOVITZ,
BY: *Ben V. Zillman*
ATTORNEY.

Feb. 9, 1960 M. A. MOSKOVITZ 2,924,469
BALL JOINT FOR INDEPENDENT STEERABLE WHEEL SUSPENSIONS
Filed Nov. 8, 1954 2 Sheets-Sheet 2

INVENTOR.
MILTON A. MOSKOVITZ,
BY: Ben V. Zillman
ATTORNEY.

United States Patent Office 2,924,469
Patented Feb. 9, 1960

2,924,469

BALL JOINT FOR INDEPENDENT STEERABLE WHEEL SUSPENSIONS

Milton A. Moskovitz, Richmond Heights, Mo., assignor of one-half to Harry Frankel, St. Louis, Mo.

Application November 8, 1954, Serial No. 467,339

8 Claims. (Cl. 287—90)

This invention relates to independent steerable wheel suspensions and more particularly to such devices as are used in automobile construction, wherein ball joints are used for interconnecting the upper and lower control arms of such mechanism to the wheel-carrying knuckle of the same.

One of the important objects of the invention is to so construct such an apparatus that it will permit of free and easy steering of the front wheels and will improve the handling characteristics of said vehicle.

Another object of my invention is to so devise an apparatus of the kind described, wherein the unbalanced loads and thrusts that are caused by unevenness in roadway and variations in steering and in the suspension geometry all of which tend to cause weaving, wobbling, shimmy and vibrations of all sorts, will be controlled and will make for easier steering, with greater certainty and safety, and at the same time permit proper pivotal movement of the steering member.

Still another object of the invention is to so construct the ball-joint for the load-carrying arm that proper lubrication is afforded at all times, and wherein wear between the joint elements is controlled and minimized.

Another object of this invention is to so construct a ball joint of the kind described, so that a predetermined resistance is built into the joint that does not carry the load, and which will thus overcome erratic steering action, and will not require any excessive joint loading to achieve such result.

A further object of my invention is to so construct a ball joint that the stud thereof may be processed from a high quality alloy steel that can be evenly and safely heat-treated throughout to provide for a maximum strength, and wherein a high degree of surface hardness is not sought. This result is obtained by interposing a properly hardened or otherwise produced wear element at the stud head and where the most wear is apt to occur. In this way, wear-resistance is acquired where needed, and the stud retains its desired uniform ductility, thereby avoiding having the stud with different degrees of hardness at adjacent portions, all of which might so weaken the stud as to cause damage and even fracture or breakage of the same during service conditions.

In the drawings, wherein like reference characters represent like parts throughout the views, Figure 1 is a fragmentary vertical elevation, partly in section, showing a right front wheel suspension;

Figure 2 is a vertical cross-sectional view of the lower ball joint structure of the same;

Figure 3 is a plan view of the retainer element for said joint;

Figure 4 is a top plan view of the bearing bushing thereof;

Figure 5 is a top plan view of an auxiliary bearing member that seats in said bushing;

Figures 6 and 7 are detail views of a modified bushing of a lower joint and the auxiliary bearing associated therewith;

Figure 8 is a fragmentary cross-sectional detail of another form of lower joint structure;

Figure 9 is a top plan view of the bushing shown in Fig. 8;

Figure 10 is a cross-sectional detail of an upper joint structure, as mounted in operative position;

Figure 11 is a top plan view of the retainer holding said joint unit to the control arm;

Figures 12–16 are further modifications of upper joint structures;

Figure 15:
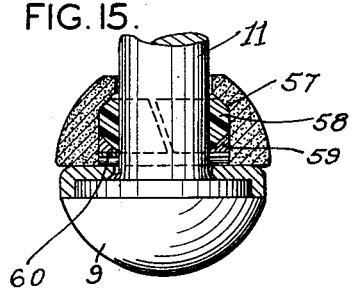

Referring more particularly to the drawings, wherein I have illustrated preferred embodiments of my invention, there is shown in Fig. 1 a right front wheel suspension assembly as seen from the rear of the vehicle, it being understood that a similar assembly is to be used for the left front wheel.

In Fig. 1, 1 indicates the brake drum mounted on a spindle rotatably supporting the front wheel 2, and there is a knuckle 3 having upper and lower bracket extensions 4 and 5 respectively and which is connected in any suitable manner to said spindle. This knuckle is supported for swinging and steering movement at said upper and lower extensions 4 and 5, by ball joints that will be more clearly hereinafter described. Steering movement of the knuckle may be accomplished in any convenient manner, as by a conventional drag link (not shown).

Such upper ball joint is arranged to permit swinging of the knuckle while at the same time it is adapted to accommodate pivoting movement vertically of an upper control arm 6 to the outer end of which said joint is connected. The lower ball joint is arranged to accommodate the swinging and steering movement of the front wheel and should be sufficiently sturdy to safely carry the loads to which it will ordinarily be subjected in service, and at the same time provide for easy and reliable steering of the wheel as the vehicle travels over all kinds of roadway.

The ball joint shown in Fig. 2 is constructed to carry the car load and in this case is associated with the lower or load-carrying arm of the vehicle. The joint includes a socket member composed of a pair of opposed shells or socket elements 7 and 8 which together form an interior chamber in which a stud is positioned for tiltable and rotational movement, the stud having a rounded head end 9 provided with a planar shoulder or face 10, the shank 11 of the stud projecting through an open end of the socket member, somewhat as shown. The shell 8 has an opening axially therethrough, the shell element 7 forming a closure for retaining the various working parts of the joint within the socket member.

One of the shells, as for instance the element 8 is provided with a concave bearing surface, as for example a hardened liner 12 affixed securely therein, one end of said shell having outwardly directed flange portions 13—13 for mounting the joint to the control arm, these shells preferably being of a relatively soft steel that is not only inexpensive, but is highly ductile so as to permit of easy and economical shaping, as by stamping.

A bushing 14 is preferably made of a material that has good lubricating characteristics, as for instance of porous or sintered cuprous or ferrous metal that is lubricant-permeable so that it may be lubricant-impregnated and remain effectively self-lubricating through the life of the joint. This bushing is interposed between said bearing surface and stud, receiving the shank of the latter therethrough and having a convex peripheral bounding surface that is substantially complemental to the bearing surface of the liner.

Such a bushing is relatively weak and fragile and not well able to withstand heavy loads or shocks in normal service, so that more suitable wear means or reinforcements are provided that act as additional or auxiliary bearing means that engage the stud head planar surface, such auxiliary means being selected so as to be better suited for taking rotational wear than the bushing itself and is preferably harder than the latter. This auxiliary means may be of a hardened steel and has a tubular shank or sleeve portion 15 provided with radially outwardly directed and circumferentially spaced-apart flange portions 16 at one end.

This wear means may loosely encircle the stud shank with a lateral clearance therebetween from one end to the other. The planar face of the bushing, or that portion that is opposed to the planar face of the stud head, is provided with circumferentially spaced-apart depressions or seats 17 that alternate with circumferentially spaced separating portions 18, the continguous substantially radially extending edges of these alternating bushing and wear means portions being beveled as indicated at 19.

The flange portions 16 of the auxiliary bearing means are of a shape, size and thickness as to fit into said bushing seats 17 and be substantially flush with the planar portions of the bushing so that these planar alternating portions of the bushing and auxiliary bearing means will engage with and wipe across the planar face of the stud head.

As the stud rotates relative to the bushing, lubricant is oozed from the latter, the bushing being under constant pressure as will be hereinafter seen, this lubricant wiping across the stud face and the bushing face and auxiliary bearing means opposed to said head, any surplus lubricant accumulating in said grooves that are formed between the contiguous bevelled edges of the bushing and wear means portions. Any excess lubricant may escape or exit through the clearance space that is between the shank and the bushing and auxiliary bearing means.

Inasmuch as the safety of the occupants of the vehicle depends in one respect on the stud strength, it is an important object of this invention to avoid any lowering of the inherent strength of the stud. It is common practice to provide localized hardened areas on such studs where they are exposed to wear under heavy loading, and yet keep the other portions of the stud relatively soft and ductile for maximum strength. In so doing, however, the stud is weakened, and fatigue, fracture and breakage is apt to occur at those areas of demarcation between its hard and soft portions. In the instant invention, the stud is of uniform hardness throughout and is processed from a high quality alloy steel that has been heat-treated to provide such uniform characteristics throughout as to be of maximum and even strength, and which has not been additionally hardened at its wear areas.

Wear means such as the cap or annulus having a planar portion 20 with an angularly directed flange portion 21, is affixed to the stud head by recessing the latter to accommodate said cap, the latter being of a material that is relatively harder than said stud material and of a good bearing quality that can absorb the rotational wear between the stud and bushing.

Any suitable pressure means may be used for yieldably and constantly urging the stud toward said bushing, as for instance by having a pressure plate 22 interposed between said stud head and the joint closure, this plate having a concave seat to receive the adjacent rounded portion of the stud head, and a rubber-like plug 23 is interposed between this plate and the closure, and is held in said compressed form after the joint has been assembled.

Although it is desired that this plug engage the annular bounding wall of the socket chamber to seal off escape of lubricant and to act as a cushion to absorb shock of stud movement, yet it is also important that this plug will last over a long period and will not rapidly acquire a "compression set" through service. Therefore, the initial shape of this plug is such that there is a relatively narrow band 24 at its base, and with a concave annular bounding wall portion 25 between said band and the other end of the plug, this plug being initially thicker than the height of the space which it finally occupies, as indicated in dotted lines.

The full lines indicate the shape of this plug when it has been compressed to operative position, changing said concave exterior into a convex form so as to engage the bounding wall of the socket chamber. The plug retains its tendency to return to its original shape, and there will be a minimum tendency for it to rapidly take on a compression set.

The shells 7 and 8 may be economically and easily shaped of relatively soft and ductile steel, by stamping, and the cost for so doing is quite low. Further, the joint may be pre-assembled as a unit or cartridge for original installations or for replacements, and the time and expense of such work is quite low. To this end and as indicated in Fig. 2, the shell 8 may be provided with an annular seat or shoulder 26 extending laterally outwardly from its liner-receiving portion, and the closure or shell 7 is similarly provided with a radially outwardly directed flange 27 of a size receivable in said seat 26.

A ductile stamping 28 is formed with a central opening to receive the closure element therethrough, and with a pair of laterally directed portions 29—29, the initial shape of one of which is indicated in dotted lines in Figs. 2 and 3, this element 28 being hammered or otherwise forced or tightened down to clamp the opposed flange portions of the mating shells together to form a permanent sealed enclosure for the socket member contents. A sealing gasket 30 may be provided between the said opposed flanges of the mating shells to prevent entry of dirt, grit or other foreign matter and to retain lubricant within the chamber. Such a permanently assembled cartridge or unit may be conveniently stored, and may be quickly and cheaply mounted to the control arm through bolts 31' or the like.

The load-supporting joint thus described will permit the required facility of relative rotation between the stud and bearing, and the auxiliary bearing means acts as a relatively anti-friction means between the stud and bushing, such auxiliary means being much better suited to take rotational wear between the contacting parts than the adjacent portions of the bushing, and at the same time provide a positiveness of lubrication of the bushing during operation of the vehicle.

In the lower or load-supporting modifications shown in Figs. 6 and 7, the sintered bushing is counterbored similarly to the one shown in Fig. 2, to receive a sleeve or tubular element 31 of stronger material than the bushing, the approximate planar face of said bushing having circumferentially spaced-apart depressions or seats to receive the separate bearing or wear means therein, the latter being of a material that is stronger and harder than that of the bushing. Said auxiliary bearing means includes radially extending planar segments 32 of a size, shape and thickness to seat in said depressions in the bushing and be substantially flush with the planar faces of the latter, there being alternately arranged bushing portions and auxiliary portions that together form the planar face of the bushing assembly for engagement with the planar face of the stud head. The radially extending ends of said segmental portions are bevelled similarly to the bevelled portions 19, and here too they provide radial grooves between contiguous portions. Thus, lubricant oozing from the bushing and that accumulated in the grooves will wipe across the opposed planar faces as relative rotation takes place between the stud and co-operating parts.

However, in order to provide an escape for lubricant in the event that excess of the latter builds up, the radially innermost portion of said auxiliary wear means that surrounds the shank is bent or tapered at 33 to provide an enlarged space between the former and stud head, this tapering also centering the wear means relatively of said bushing, and similarly the central bore through said wear means, sleeve and bushing is sufficiently larger than the shank diameter thereat so as to provide an annular clearance through which lubricant may exit.

In Figures 8 and 9 there is shown another modified form of load-carrying joint wherein a plurality of individual auxiliary bearing segments 34 are seated in the planar face of the bushing flush therewith, so as to present circumferentially spaced-apart alternate areas of auxiliary bearing means and bushing to said stud head, the contiguous ends of said adjacent areas provided with grooves similar to those hereinbefore described, and for the same purpose.

The other ball joint connecting the knuckle to the upper control arm and not carrying the load, is designed so as to provide a resistance against freedom of stud rotation, and this is attained without requiring undue loading of this joint. The joint shown in Figs. 10 and 11 comprise a pair of cup-like shells 35—36 to together form the socket member and arranged with their central openings opposed to form the chamber therebetween, one of said elements, as for instance the element 36 being hardened as compared with the relatively soft and ductile element 35 and is provided with the concave bearing surface therein at one end. The element 35 may be readily formed by stamping or the like, and forms a closure for the joint and is provided with a peripheral flanged portion 37 to straddle an outwardly directed flange of the element 36 to clamp the pair of shells together, and if desired a sealing gasket may be put between the opposed faces of said shells.

The cartridge or unit thus produced may be detachably affixed, as a whole, to the corresponding control arm through a stamped cover element 38 having a central opening therethrough and to abut against a portion of said arm, said element 38 having bolt holes for detachably fastening said joint unit to said control arm.

A bushing 39 preferably of a relatively weak material such as of a cuprous or ferrous metal, is interposed between said stud and bearing surface, encircling said shank and having an exterior convex surface to bear on the complemental concave bearing surface of the socket element.

A radially contractile wedge element 40 has a central bore therethrough to receive and frictionally co-act with the stud shank and is provided with a tapered annular peripheral surface 41 to slidably engage a correspondingly tapered opening 42 through said bushing. This wedge element is of a material preferably stronger than said bushing and may have a flange or shoulder 43 extending radially at its large end, and this wedge may be made in one piece having a longitudinal split therethrough or it may be in a series of annularly arranged segments.

Auxiliary bearing means or cap 21 is secured to said stud head to form the wear face of the latter and engage the opposed wedge face. Pressure means similar to that shown in Fig. 2 may be interposed between the stud head and the closure to yieldably urge the head toward said wedge. Obviously as wear occurs between the wedge and stud the wedge is pressed further into the tapered opening of the bushing.

The wedge element is counterbored to provide an annular cavity between said counterbore and the stud shank and in which a contractile sleeve 44 of a material having a relatively high coefficient of friction, as of nylon, phenolic material or other suitable substance, is received to extend axially of the shank and engage the latter. The sleeve too, may be made either of one piece with a longitudinal split therethrough or of several adjacently arranged circumferentially extending elements. Obviously, as the stud moves relatively of the socket member, both the wedge element and the sleeve act to set up friction resistance to restrict the ease of rotation of the stud, increasing as the wedge moves into the bushing, and thus acting to improve the steering characteristics of the vehicles even when the latter is travelling over rough and uneven roads.

In Fig. 12 there is illustrated another modification of an upper ball joint, and in this instance the socket member is made as a shell 45 having an externally threaded portion 46 intermediate its ends and whereby this cartridge may be detachably mounted to the cooperating vehicle member, such as to a control arm, the end closure of the socket member being indicated as a disk 47 having a concave under side 48 and which is suitably held locked in place upon assembly of the joint structure.

Here, the pressure plate and the yieldable pressure means have been combined into a single, simple element consisting of a spring plate 49 interposed between the closure and the rounded stud head. This plate is provided with a plurality of circumferentially spaced radially extending fingers 50 that are bent back or made reentrant with respect to the main body portion of the plate, this bending being to a relatively sharp angle thought most suitable for the purpose. The central or main body portion of this plate is rounded to form a concave seat 51 that receives the rounded portion of the stud head, the outer convex face 52 of said plate being of greater curvature than that of the opposed concave face 48 of the closure disk so as to leave a slight clearance therebetween and permit flexing of said plate thereat.

Placement of the closure into assembled relation will force the fingers of the plate to the full line position shown, and the plate will be firmly held in proper relationship, yieldably pressing against the stud head to axially actuate the stud in one direction, and being centered by said head.

Figure 13 illustrates another modification of upper joint structure, wherein the tubular wedge element 53 interposed between the stud and bushing is preferably made in either one piece with a longitudinal split therethrough, or made of circumferentially spaced segments, said wedge being of a material that has a relatively high coefficient of friction as compared to its cooperating elements, as for instance of nylon, a phenolic compound, or the like. Obviously, as the stud is pressed axially in one direction, the wedge is urged in said direction and sets up increasing friction between the bushing and shank to restrict freedom of rotation of the stud.

Figure 14 illustrates a further modification of an upper ball joint, the bushing being provided with a central bore therethrough to encircle the stud shank, and having an annular cavity or seat 54 extending radially outwardly from said bore, the outer edge of said seat being tapered. The under face of said stud head has a tapered shoulder 55 corresponding to the tapered edge of the seat. A circumferentially split washer 56 is arranged between said stud and bushing, shaped to fit in said seat, with its tapered portion lying smoothly against the tapered portion of the latter. Axial pressure in one direction, on the stud, will of course wedge the washer firmly between the pair of opposed tapered portions to grip the stud to restrain freedom of rotation of the stud.

In Fig. 15 there is a further modification of the upper ball joint, and here the bushing is provided with a central bore to receive the stud shank therethrough, said bore being counterbored, with one end thereof bevelled at 57. A contractile annulus 58 either of a split one-piece structure or of circumferentially segmental form, and preferably of a high friction material such as nylon, phenolic composition or the like, with bevelled end faces, is interposed in the space between the shank and bushing. A second annulus 59 is superimposed on the annulus 58, having a bevelled face to ride against the correspondingly bevelled adjacent face of the latter. A spring element in the form of a corrugated washer 60 is interposed between the planar face of the stud head and the adjacent face of the annulus 59 to urge the latter toward the first annulus as the stud is urged in that direction, as the stud is urged by suitable resilient pressure means (not herein shown).

Figure 16:
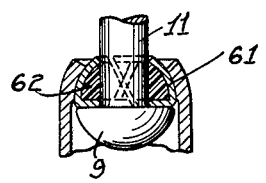
Figure 17:
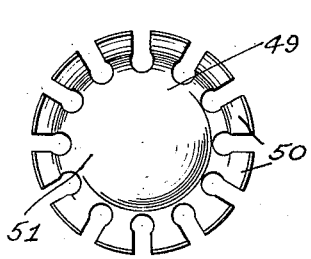
Figure 17 is a plan view of the spring plate used in the joint shown in Fig. 12.

Fig. 16 illustrated herein shows another modified form of upper ball joint, wherein the stud head is urged in one direction axially by suitable means (not herein shown), there being a bushing element 61 in the form of a shell, and preferably of one piece that is longitudinally split and arranged between the concave bearing face of the socket member and the stud, somewhat as shown. An insert 62, that is radially contractile, and of nylon, phenolic composition or the like, that has a relatively high coefficient of friction, and having a radial split therethrough, acts to grip the stud shank and restrict its freedom of rotation as the bushing is actuated axially in one direction (by the means not herein shown).

Figure 18:
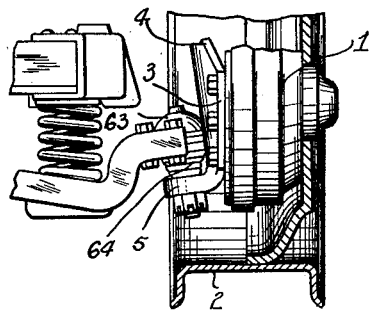
Figure 18 is a fragmentary vertical elevation, partly in section, of a right front wheel suspension wherein the stud of the lower joint structure is under a compression load.
Figure 19:
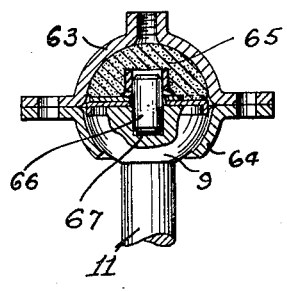
Figure 19 is a vertical cross sectional view of the lower ball joint structure of the same.
Figure 20:
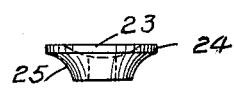
Figure 20 is a side elevation of the plug shown in Figs. 2 and 10.
Figure 21:
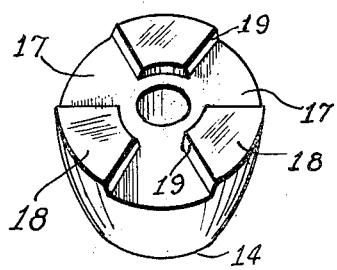
Figure 21 is a perspective view of the bushing shown in Fig 4.

In Fig. 18 the load-carrying joint interconnecting the control arm to the knuckle, is arranged so that the stud element thereof takes the load in compression, rather than in tension as illustrated in Figs. 1 and 2. Fig. 19 shows one form of joint to achieve this result, it being particularly noted that no means need be provided for yieldably pressing the stud toward its seat. The socket member herein shown comprises a pair of mating shell elements 63 and 64 that are connectible to form the enclosing unit, said stud having its enlarged head end rotatable and tiltable within said socket member. The bushing or bearing element 65 has its convex exterior complemental to and bearing on the concave interior of the shell 63. Both the stud head and the bushing are provided with registering cylindrical openings thereinto to slidably receive a pin 66 floating longitudinally in said cylindrical openings 67.

The planar end of the stud head may have a wear element or cap thereon for substantially the same purpose as previously set forth, and similarly there may be an auxiliary bearing means and wear means in said bushing, substantially flush with the planar face of the latter, the grooves between the adjacent ends of the bushing planar portions and the auxiliary bearing portions being of substantially the same forms previously described and for the same purpose.

Figure 22:
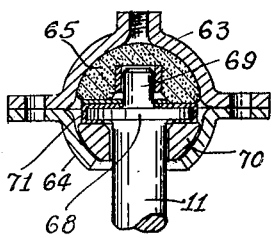
Figure 22 is a vertical cross-sectional view of another form of lower ball joint.

In Fig. 22 the stud is formed somewhat differently than heretofore set forth, in this case with a disk-like or flanged head end 68, and with a short cylindrical projection 69 beyond said end 68. An externally convex element 70 encircles said stud shank. The bushing is provided with auxiliary bearing means of the kind heretofore set forth, on its planar face and is provided with a central bore to floatingly receive said portion 69 of the stud head. A wear element 71 is formed as a sheath for said stud end 68, straddling the same and bearing against the alternately arranged portions of the bushing and the auxiliary bearing means. By making a structure of this kind, there are important economies, inasmuch as such a head can be formed far cheaper than the externally rounded head.

I claim:

1. In a joint of the kind described and in combination, a socket member having a concave bearing surface in one end, a stud rotatable and tiltable in said member and provided with a rounded head and with a shank extending through said member, a bushing in said member between said stud and bearing surface and having circumferentially-spaced apart seats in its head-engaging surface, and separate bearing means in said seats and having a head-engaging face substantially flush with the head-engaging surface of said bushing.

2. In a joint of the kind described, a socket member having a concave bearing surface, a stud rotatable and tiltable in said member and having a rounded head and a shank, a bushing encircling said shank and having a surface engaging said bearing surface and head, said bushing having circumferentially spaced seats in its head-engaging surface, and auxiliary bearing means having circumferentially-spaced portions in said seats and of a thickness to be substantially flush with the adjacent face of said bushing when seated and engage said head simultaneously with engagement of the latter by said bushing.

3. A device as set forth in claim 2, but further characterized in that the head-engaging faces of said bushing and auxiliary bearing means are circumferentially alternately arranged and that the adjacent ends of said auxiliary bearing means and bushing are formed with substantially radially extending lubricant-retaining grooves and whereby lubricant from said bushing and said grooves is wiped across the opposed face of said head upon relative rotation between the same.

4. In a joint of the kind described and in combination, a socket member having a concave bearing surface at one end thereof, a stud rotatable and tiltable in said member and with a rounded head and with an elongated shank extending through said member, a lubricant-permeable bushing encircling said shank and engaging between said bearing surface and head and having circumferentially-spaced seats in its face that is opposed to said head, auxiliary bearing means in said bushing and carried in said seats to engage said head and encircling said shank, said bushing and auxiliary bearing means having means therebetween to limit rotational and transverse shifting movement of said auxiliary bearing means relatively of said bushing, and means yieldably urging said head toward said bushing.

5. In a joint of the kind described and in combination, a socket member having a concave bearing surface at one end, a metal stud rotatable and tiltable in said member and provided with a rounded head end and with an elongated shank, a lubricant-permeable bushing encircling said shank and engaging said bearing surface and having circumferentially-spaced seats in its head-engaging face, and auxiliary bearing means in said seats substantially flush with the head-engaging face of said bushing.

6. A device as set forth in claim 5 but further characterized in that the contiguous ends of said auxiliary bearing means and bushing have substantially radial grooves therebetween in which any retained lubricant is wiped across the contacting faces of said head and bushing as relative rotation occurs between the same.

7. In a joint of the kind described comprising a socket member having a concave bearing surface in one end, a stud rotatable and tiltable in said member and having a radially enlarged head and an elongated shank, said head terminating at its under side in a radially inwardly directed planar face, a lubricated bushing engaging said bearing surface, and wear means fixedly mounted on said stud and harder than the adjacent portion of the latter to movably engage said bushing, said wear means having a radially inwardly directed flange fitted between said planar face and the bushing to engage the latter and having an annular axially directed flange fitted on said stud head and directed toward the outermost end of the latter.

8. In a joint of the kind described comprising a socket member having a concave bearing surface in one end, a stud rotatable and tiltable in said member and provided with a radially enlarged head and an elongated shank, said head having a radially inwardly directed substantially planar face, a lubricated bushing engaging said bearing surface and movable relatively to said stud, and wear means fixedly carried by and encircling said stud and harder than the adjacent portion of the latter to movably engage said bushing, said wear means having a radially inwardly directed flange fitted between said planar face and bushing to engage the latter and with an annular axially directed flange fitted on said stud head to peripherally surround said planar face.

References Cited in the file of this patent

UNITED STATES PATENTS

| | | |
|---|---|---|
| 1,883,882 | Davis | Oct. 25, 1932 |
| 2,147,815 | Hufferd et al. | Feb. 21, 1939 |
| 2,369,091 | Venditty | Feb. 6, 1945 |
| 2,388,950 | Booth | Nov. 13, 1945 |
| 2,424,455 | Graham et al. | July 22, 1947 |
| 2,507,087 | Booth | May 9, 1950 |
| 2,521,335 | Booth | Sept. 5, 1950 |
| 2,569,823 | Moskovitz | Oct. 2, 1951 |
| 2,593,253 | Booth | Apr. 15, 1952 |
| 2,631,044 | Booth | Mar. 10, 1953 |
| 2,676,045 | Moskovitz | Apr. 20, 1954 |
| 2,686,070 | Booth | Aug. 10, 1054 |
| 2,823,055 | Booth | Feb. 11, 1958 |

FOREIGN PATENTS

| | | |
|---|---|---|
| 151,519 | Australia | May 20, 1953 |
| | (U.S. Corresponding 2,645,510, July 14, 1953) | |
| 338,248 | Italy | Mar. 31, 1936 |